United States Patent
Harris

(10) Patent No.: US 6,907,043 B2
(45) Date of Patent: Jun. 14, 2005

(54) METHOD AND APPARATUS FOR TRANSMITTING VOCODED INFORMATION

(75) Inventor: John M. Harris, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 72 days.

(21) Appl. No.: 10/139,844

(22) Filed: May 6, 2002

(65) Prior Publication Data

US 2003/0206539 A1 Nov. 6, 2003

(51) Int. Cl.[7] .............................................. H04L 12/28
(52) U.S. Cl. ...................................... 370/412; 370/428
(58) Field of Search ................................. 370/412, 413, 370/414, 415, 416, 417, 418, 428, 429

(56) References Cited

U.S. PATENT DOCUMENTS

| | | | |
|---|---|---|---|
| 4,942,570 A | | 7/1990 | Kotzin et al. |
| 5,606,569 A | * | 2/1997 | MacDonald et al. ........ 714/758 |
| 5,715,526 A | * | 2/1998 | Weaver et al. .............. 455/126 |
| 6,081,919 A | * | 6/2000 | Fujiwara et al. ............ 714/755 |
| 6,222,830 B1 | * | 4/2001 | Padovani et al. ........... 370/332 |
| 6,400,724 B1 | * | 6/2002 | Yao ............................ 370/429 |
| 6,445,696 B1 | * | 9/2002 | Foodeei et al. ............. 370/356 |
| 2003/0099240 A1 | * | 5/2003 | Lee ............................ 370/413 |

* cited by examiner

Primary Examiner—Chi Pham
Assistant Examiner—Keith M. George
(74) Attorney, Agent, or Firm—Jeffrey K. Jacobs

(57) ABSTRACT

The embodiments disclosed provide a manner of transmitting voice information that strikes an improved balance between voice quality and RF capacity in a CDMA dispatch environment. In general, two half-rate vocoder frames (201 and 202) are assembled into a single full rate transmit frame (200) to enable the transmission of alternating full-rate frames. Additionally, an individual CRC (203 and 204) is provided for each half-rate frame within the transmit frame to allow for partial recovery when frame corruption or erasure occurs. In this manner, system capacity is improved, particularly in the CDMA dispatch environment, while preserving voice quality.

16 Claims, 3 Drawing Sheets

METHOD AND APPARATUS FOR TRANSMITTING VOCODED INFORMATION

FIELD OF THE INVENTION

The present invention relates generally to transmitting voice information and in particular, to a method and apparatus for transmitting vocoded information within a communication system.

BACKGROUND OF THE INVENTION

Recently it has been proposed to add dispatch capabilities to Code Division Multiple Access (CDMA) systems such as CDMA 2000 systems. Unlike the interconnect services provided by today's cellular systems, dispatch services have been traditionally provided by two-way radio systems. Such services allow a user to communicate in ways that are difficult or costly using today's cellular systems. The dispatch group call service, for example, enables a user to communicate with a group of people simultaneously and instantaneously, usually just by depressing a push-to-talk (PTT) button. Using a cellular system, such a call could not occur instantaneously since either telephone numbers would need to be dialed for a three-way call or arrangements would need to be made to setup a conference call.

Likewise, the dispatch individual (typically called a private call) call service enables a user to communicate with another user quickly and spontaneously. This feature is ideal for two people who are working together but are unable to speak with one another directly such as two people working in concert but in different parts of a building. Where a wireless telephone call is more appropriate for a conversation, short messages between two people as they work are better facilitated by the dispatch individual call service.

Within cellular communication systems, voice quality is often perceived by the user as the most important attribute to any call. Cellular providers along with equipment manufacturers continuously strive to improve voice quality within cellular communication systems. A trade off in voice quality exists in that usually a higher quality voice channel requires more Radio Frequency (RF) capacity, limiting the total number of calls a system can simultaneously provide. Therefore, a need exists for a method and apparatus for transmitting voice information that strikes an improved balance between voice quality and RF capacity in a CDMA dispatch environment.

DETAILED DESCRIPTION OF EMBODIMENTS

The embodiments disclosed provide a manner of transmitting voice information that strikes an improved balance between voice quality and RF capacity in a CDMA dispatch environment. In general, two half-rate vocoder frames are assembled into a single full rate transmit frame to enable the transmission of alternating full-rate frames. Additionally, an individual CRC is provided for each half-rate frame within the transmit frame to allow for partial recovery when frame corruption occurs. In this manner, system capacity is improved, particularly in the CDMA dispatch environment, while preserving voice quality.

Figure 1:
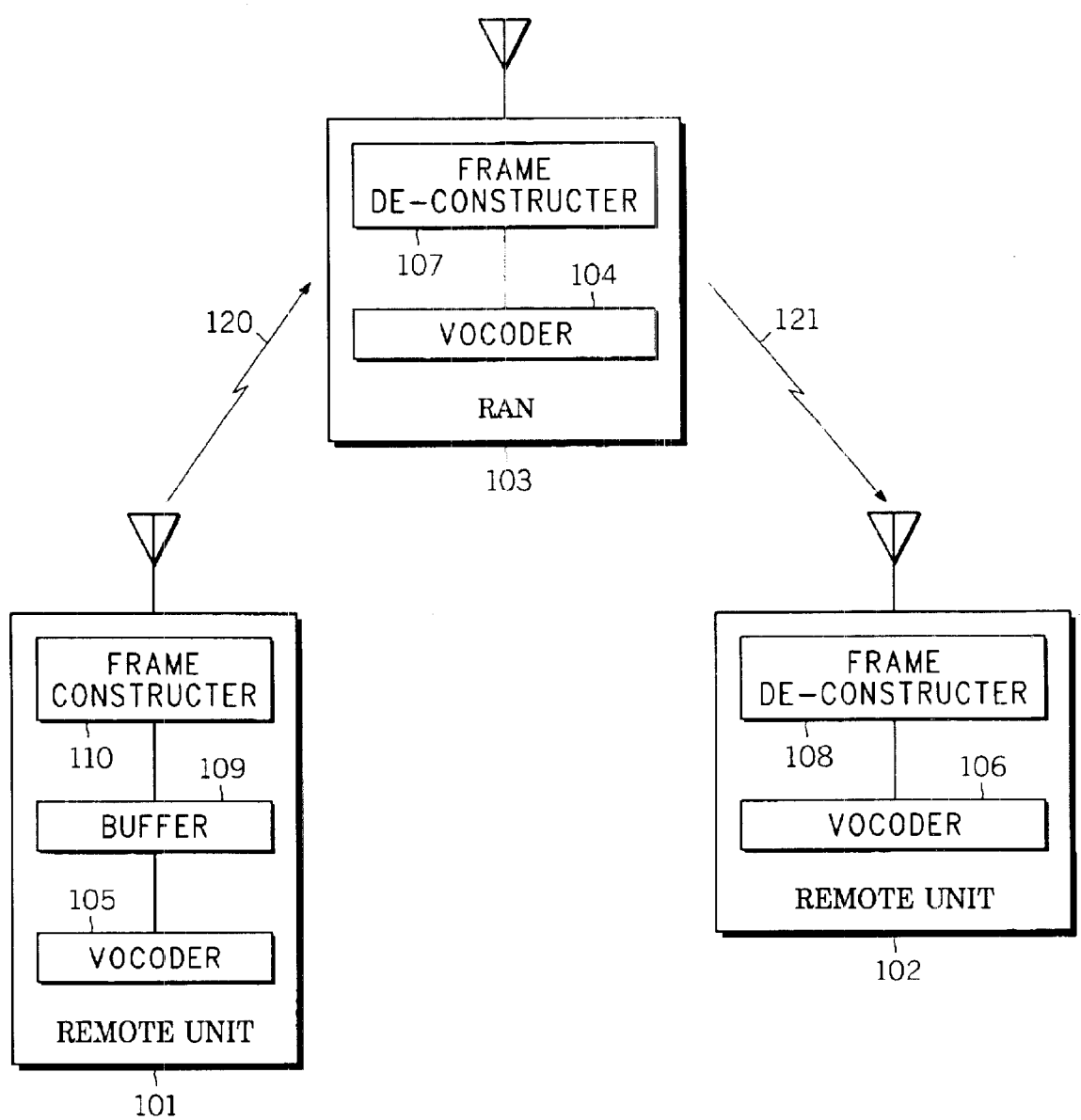
FIG. 1 is a block diagram of a communication system in accordance with an embodiment of the present invention.

The disclosed embodiments can be more fully understood with reference to FIGS. 1–4. FIG. 1 is a block diagram depiction of a communication system 100 in accordance with an embodiment of the present invention. Communication system 100 is a well-known Code Division Multiple Access (CDMA) system, specifically a CDMA 2000 system, which is based on the Telecommunications Industry Association/Electronic Industries Association (TIA/EIA) standard IS-2000, suitably modified to implement the present invention. The IS-2000 standard is hereby incorporated by reference. (The TIA/EIA can be contacted at 2001 Pennsylvania Ave. NW, Washington, D.C. 20006). In alternate embodiments, communication system 100 may utilize other cellular communication system protocols such as, but not limited to, UMTS, 1xEVDV, and 1xEVDO.

One embodiment of the present invention includes radio access network (RAN) 103 and remote units, such as mobile stations (MSs) 101 and 102. RAN 103 communicates with MS 101 and 102 via CDMA 2000 air interface resources 120 and 121. However, the present invention is not limited to remote units that are mobile. For example, a remote unit may comprise a desktop computer wirelessly connected to the radio access network.

Those skilled in the art will recognize that FIG. 1 does not depict all of the network equipment necessary for system 100 to operate but only those logical entities particularly relevant to the description of embodiments of the present invention. For example, RAN 103 and remote units 101 and 102 comprise well-known entities such as vocoders 104–106, frame constructer 110, and frame de-constructers 107 and 108. Those skilled in the art are aware of the many ways each of these entities can be implemented and/or purchased from wireless communications companies such as "MOTOROLA"(located at 1303 East Algonquin Road, Schaumburg, Ill. 60196).

Frame constructers/de-constructers, for example, typically comprise components such as processors, memory, and/or logic circuitry designed to implement algorithms that have been expressed as computer instructions and/or in circuitry. Given an algorithm or a logic flow, those skilled in the art are aware of the many design and development techniques available to implement frame constructers/de-constructers that perform the logic. Thus, frame constructer 110 is designed to implement the algorithm illustrated in FIG. 3, while frame de-constructers 107 and 108 are designed to implement the algorithm illustrated in FIG. 4.

Operation of communication system 100 occurs as follows. Communication system 100 utilizes a full rate CDMA air frame for the link layer to transport data or voice traffic between a mobile unit and infrastructure equipment. In particular, during a typical call voice-encoded (vocoded) voice data is transmitted over the air. In one embodiment of the present invention, the IS-2000 voice service option 56—Selectable Mode Vocoder (SMV) voice encoder is utilized for over-the-air transmission of this voice data and is operated in a half rate frame maximum mode. The vocoder in the transmitting unit, vocoder 105, outputs a first vocoded frame followed by a second vocoded frame when voice is received as input. Buffer 109 stores this first vocoded frame for up to a predefined period of time. In the present embodiment, this period of time is 20 milliseconds.

If a second vocoded frame is output from vocoder 105 before the first vocoded frame has been stored in the buffer for 20 milliseconds, frame constructer 110 assembles a transmit frame comprising both the first vocoded frame and the second vocoded frame. However, if the second vocoded frame is not output from vocoder 105 before the first vocoded frame has been stored in the buffer for 20 milliseconds, frame constructer 110 assembles a transmit frame comprising the first vocoded frame in duplicate. That is, two copies of the first vocoded frame are assembled.

Frame constructer 110 also calculates a first inner Frame Quality Indicator (FQI) to represent the quality of the first vocoded frame, and in the case where the second vocoded frame was output in time, frame constructer 110 calculates a second inner FQI to represent the quality of the second vocoded frame. Although any FQI metric may be used, the present embodiment utilizes a 5-bit cyclical redundancy checking (CRC) indicator for each inner FQI. In addition to the inner FQIs, frame constructer 110 calculates an outer FQI to represent the quality of the transmit frame as a whole.

Figure 2:
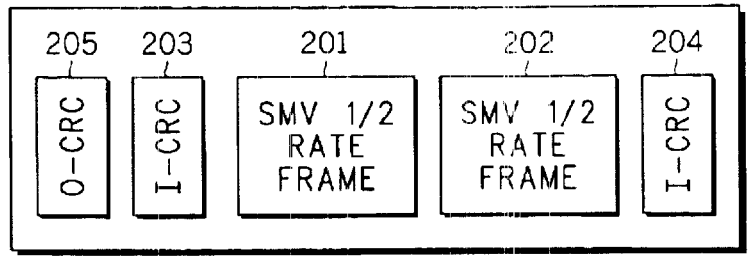
FIG. 2 illustrates a frame structure in accordance with an embodiment of the present invention.

FIG. 2 illustrates a frame structure in accordance with the present embodiment. Transmit frame 200 comprises the first and second vocoded frames (frames 201 and 202, respectively), their corresponding inner CRCs (CRCs 203 and 204, respectively), and the outer CRC 205. Transmit frame 200 is a full-rate CDMA air frame. The first and second vocoded frames are each half-rate SMV frames. Because convolutional codes are used on CDMA 2000 fundamental channels (e.g., FCH and DCCH), transmit frame 200 is a convolutionally-coded, 20 millisecond frame. Bit errors on convolutional codes tend to occur in clumps or groups and are substantially less likely at either end of a convolutionally-coded frame. Thus, in addition to using inner CRCs to isolate bit errors, the present embodiment positions inner CRCs 203 and 204 at the beginning and the end of the bearer portion of transmit frame 200.

In the case where transmit frame 200 is assembled using the first vocoded frame in duplicate, frames 201 and 202 will be identical as will inner CRCs 203 and 204. Thus, when a second vocoded frame is not available in time, the first vocoded frame is effectively sent twice, further reducing the chance that it will be erased. The "empty" bearer portion of frame 200 is thereby used to improve the overall voice quality. In the more typical case where transmit frame 200 is assembled using the first and second vocoded frames, two half-rate vocoder frames are sent in one full-rate 20 millisecond CDMA transmit air frame. Because two frames are sent at once, full-rate 20 msec transmit frames can be interspersed with DTX frames (DCCH case) or eighth rate frames (FCH case). In the dispatch environment, this can result in increased system capacity, especially when combined with embodiments disclosed in the co-pending application "INTERFERENCE-EFFICIENT METHOD AND APPARATUS TO PROVIDE CDMA SERVICES" filed on even date herewith, and assigned to the assignee of the instant application.

When a frame, such as transmit frame 200, is received by RAN 103 or remote unit 102. Frame de-constructer 107, for example, checks the outer FQI to determine whether the frame as a whole is corrupted. If the outer FQI indicates that the frame as a whole has not been corrupted, then frame de-constructer 107 can pass both embedded vocoder frames to vocoder 104 for conversion to a voice signal. If instead the outer FQI indicates that the frame as a whole has not been corrupted, then frame de-constructer 107 will discard either or both embedded vocoder frames only if their corresponding inner FQIs indicate that they individually have been corrupted.

Figure 3:
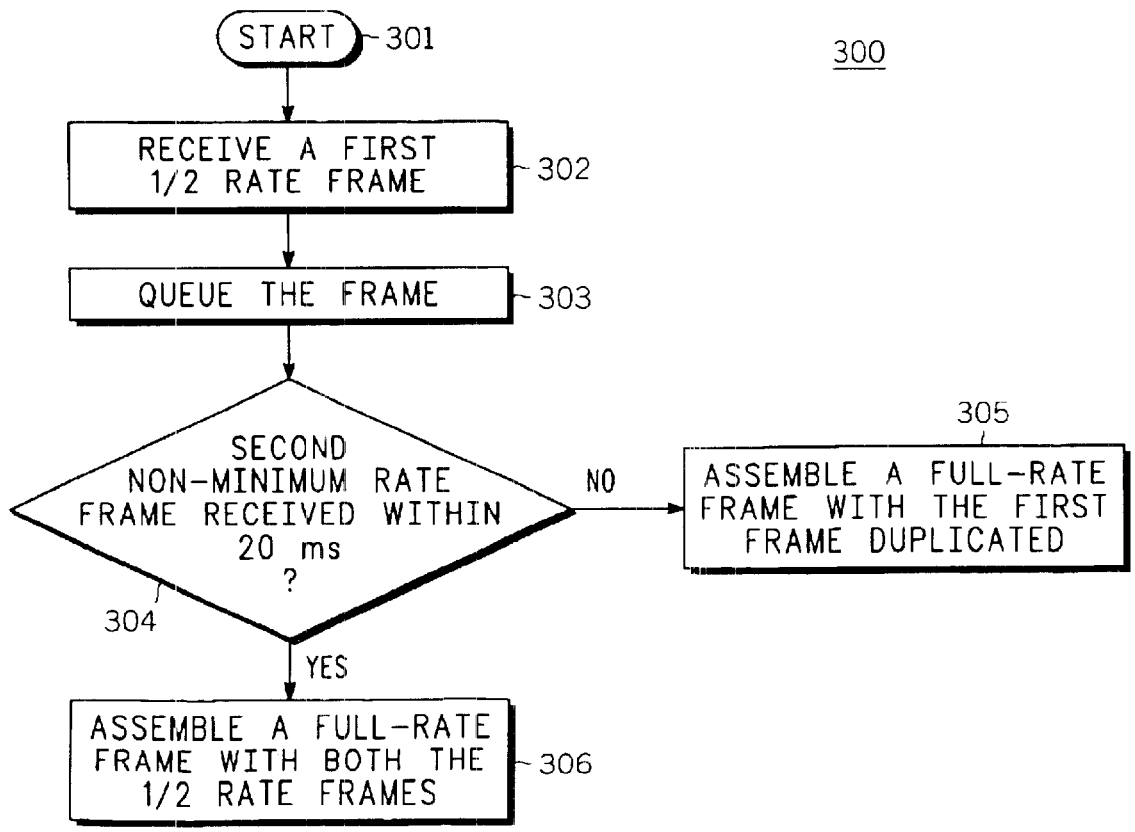
FIG. 3 is a logic flow diagram illustrating the operation of a transmitting apparatus in accordance with an embodiment of the present invention.

FIG. 3 is a logic flow diagram illustrating the operation of a transmitting apparatus in accordance with an embodiment of the present invention. Logic flow 300 begins (301) when a first half-rate, vocoded frame is received (302) from a vocoder. The frame is queued (303) for up to 20 milliseconds. If (304) another half-rate, vococied frame is received from the vocoder before the 20 milliseconds expires, a full-rate 20 msec transmit air frame is asseibled (306) using both half-rate, vocoded frames. Otherwise, a full-rate transmit frame is assembled (305) using two copies of the first half-rate, vocoded frame.

Figure 4:
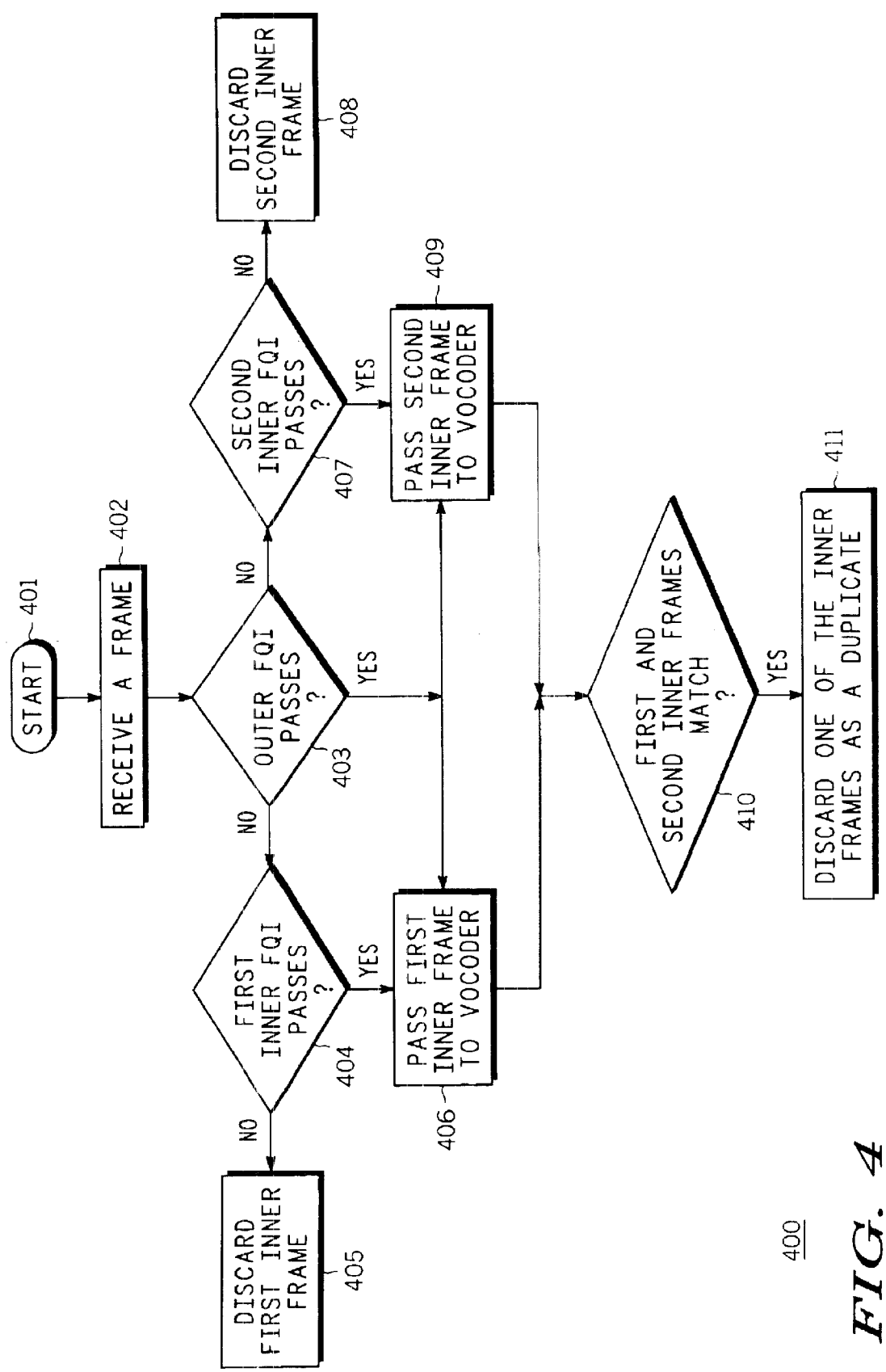
FIG. 4 is a logic flow diagram illustrating the operation of a receiving apparatus in accordance with an embodiment of the present invention.

FIG. 4 is a logic flow diagram illustrating the operation of a receiving apparatus in accordance with an embodiment of the present invention. Logic flow 400 begins (401) when a full-rate frame is received (402). The outer FQI is checked to determine whether the frame as a whole has been corrupted. If (403) not, pass (406 and 409) both inner half-rate, vocoded frames to a vocoder for conversion to voice. Instead, if the outer FQI indicates that the frame is corrupted, each of the inner FQIs is checked. If (404 and 407) the inner FQI indicates that the corresponding inner half-rate frame is corrupted, the inner frame is discarded (405 and 408). Otherwise, either or both of the inner frames whose FQIs indicate that they have not been corrupted are sent on to the vocoder. In the case where two copies of a vocoded frame have been received, this is determined by comparing (410) the two vocoded frames and their CRCs in the single transmit frame (a special bit may also be used to indicate that this frame has duplicate information). When two uncorrupted, duplicate vocoded frames are received, one is discarded (411).

In the foregoing specification, the present invention has been described with reference to specific embodiments. However, one of ordinary skill in the art will appreciate that various modifications and changes may be made without departing from the spirit and scope of the present invention as set forth in the appended claims. Benefits have been described above with regard to specific embodiments of the present invention. However, the benefits, and any element(s) that may cause or result in such benefits or cause such benefits to become more pronounced, are not to be construed as a critical, required, or essential feature or element of any or all the claims. As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus.

What is claimed is:

1. A method for transmitting vocoded information comprising:

receiving a first vocoded frame from a vocoder;

queuing the first vocoded frame;

when the first vocoded frame has been queued for a predefined period of time, assembling a transmit frame comprising the first vocoded frame in duplicate, calculating a first inner Frame Quality Indicator (FQI) to represent a quality of the first vocoded frame, and calculating an outer FQI representing a quality of the transmit frame as a whole, wherein assembling the transmit frame comprising the first vocoded frame in duplicate further comprises assembling the transmit frame to further comprise the first inner FQI in duplicate and the outer FQI;

when a second vocoded frame is received from the vocoder before the first vocoded frame has been queued for the predefined period of time, assembling a transmit frame comprising the first vocoded frame and the second vocoded frame, wherein the first vocoded frame and the second vocoded frame are half rate vocoder frames and wherein the transmit frame is a full rate air frame.

2. The method of claim 1, wherein the vocoder is IS-2000 voice service option 56—Selectable Mode Vocoder.

3. The method of claim 1, wherein the transmit frame comprises a full rate 20 millisecond CDMA air frame.

4. The method of claim 3, wherein the transmit frame comprises a convolutionally coded full rate frame.

5. The method of claim 1, wherein the predefined period of time is approximately 20 milliseconds.

6. The method of claim 1 further comprising:
when the second vocoded frame is received from the vocoder before the first vocoded frame has been queued for the predefined period of time,
calculating a first inner Frame Quality Indicator (FQI) to represent a quality of the first vocoded frame,
calculating a second inner FQI representing a quality of the second vocoded frame, and
calculating an outer FQI representing a quality of the transmit frame as a whole, wherein assembling the transmit frame comprising the first vocoded frame and the second vocoded frame further comprises assembling the transmit frame to further comprise the first inner FQI, the second inner FQI, and the outer FQI.

7. The method of claim 6, wherein in the transmit frame the first inner FQI precedes the first vocoded frame, the first vocoded frame precedes the second vocoded frame, and the second vocoded frame precedes the second inner FQI.

8. The method of claim 6, wherein calculating the first inner FQI comprises generating a cyclical redundancy checking (CRC) indicator for the first vocoded frame and wherein calculating the second inner FQI comprises generating a CRC indicator for the second vocoded frame.

9. The method of claim 1, wherein calculating the first inner FQI comprises generating a cyclical redundancy checking (CRC) indicator for the first vocoded frame.

10. The method of claim 1, wherein in the transmit frame the first inner FQI precedes the first vocoded frame, the first vocoded frame precedes a duplicate of the first vocoded frame, and the duplicate of the first vocoded frame precedes a duplicate of the first inner FQI.

11. An apparatus comprising:
a vocoder adapted to output a first vocoded frame followed by a second vocoded frame when voice is received as an input;
a buffer, coupled to the vocoder, for storing the first vocoded frame;
a frame constructer, coupled to the buffer,
adapted to assemble a transmit frame comprising the first vocoded frame in duplicate when the first vocoded frame has been stored in the buffer for a predefined period of time and
adapted to assemble a transmit frame comprising the first vocoded frame and the second vocoded frame when the second vocoded frame is output from the vocoder before the first vocoded frame has been stored in the buffer for the predefined period of time, wherein the first vocoded frame and the second vocoded frame are half rate vocoder frames and wherein the transmit frame is a full rate air frame, wherein when the first vocoded frame has been stored in the buffer for a predefined period of time, the frame constructer is
further adapted to calculate a first inner Frame Quality Indicator (FQI) to represent a quality of the first vocoded frame,
further adapted to calculate an outer FQI representing a quality of the transmit frame as a whole, and
adapted to assemble the transmit frame to further comprise the first inner FQI in duplicate and the outer FQI.

12. The apparatus of claim 11, wherein when the second vocoded frame is received from the vocoder before the first vocoded frame has been queued for the predefined period of time, the frame constructer is
further adapted to calculate a first inner Frame Quality Indicator (FQI) to represent a quality of the first vocoded frame,
further adapted to calculate a second inner FQI to represent a quality of the second vocoded frame,
further adapted to calculate an outer FQI representing a quality of the transmit frame as a whole, and
adapted to assemble the transmit frame to further comprise the first inner FQI, the second inner FQI, and the outer FQI.

13. The apparatus of claim 12, wherein in the transmit frame the first inner FQI precedes the first vocoded frame, the first vocoded frame precedes the second vocoded frame, and the second vocoded frame precedes the second inner FQI.

14. The apparatus of claim 11, wherein in the transmit frame the first inner FQI precedes the first vocoded frame, the first vocoded frame precedes a duplicate of the first vocoded frame, and the duplicate of the first vocoded frame precedes a duplicate of the first inner FQI.

15. A method for receiving vocoded information comprising:
receiving a frame comprising an outer FQI, a first inner FQI, a first vocoded frame, a second inner FQI, and a second vocoded frame, wherein the outer FQI indicates a quality of the frame as a whole, the first inner FQI indicates a quality of the first vocoded frame, and the second inner FQI indicates a quality of the second vocoded frame, and wherein the first and the second vocoded frames represent vocoded frames transmitted in duplicate and the first and the second inner FQIs represent FQIs transmitted in duplicate;
when the outer FQI indicates that the frame as a whole is corrupted,
discarding the first vocoded frame when the first inner FQI indicates that the first vocoded frame is corrupted; and
discarding the second vocoded frame when the second inner FQI indicates that the second vocoded frame is corrupted, wherein the first vocoded frame and the second vocoded frame are half rate vocoder frames and wherein the frame is a full rate air frame.

16. An apparatus comprising:
a frame de-constructer, coupled to the vocoder, adapted to receive a frame comprising an outer FQI, a first inner FQI, a first vocoded frame, a second inner FQI, and a second vocoded frame, wherein the outer FQI indicates a quality of the frame as a whole, the first inner FQI indicates a quality of the first vocoded frame, and the second inner FQI indicates a quality of the second vocoded frame, and wherein the first and the second vocoded frames represent vocoded frames transmitted in duplicate and the first and the second inner FQIs represent FQIs transmitted in duplicate, adapted to discard the first vocoded frame when the outer FQI indicates that the frame as a whole is corrupted and the first inner FQI indicates that the first vocoded frame is corrupted, and adapted to discard the second vocoded frame when the outer FQI indicates that the frame as a whole is corrupted and the second inner FQI indicates that the second vocoded frame is corrupted; and a vocoder adapted to generate a voice signal from undiscarded vocoded frames output from the frame de-constructer, wherein the first vocoded frame and the second vocoded frame are half rate vocoder frames and wherein the frame is a full rate air frame.

* * * * *